United States Patent [19]

Christine

[11] Patent Number: 4,767,478
[45] Date of Patent: Aug. 30, 1988

[54] ATTACHING A PLASTIC TUBE TO A WEB OF PLASTIC

[75] Inventor: William C. Christine, Catasauqua, Pa.

[73] Assignee: Triparte Ltd., Nazareth, Pa.

[21] Appl. No.: 908,057

[22] Filed: Sep. 16, 1986

[51] Int. Cl.⁴ .............................................. B32B 31/20
[52] U.S. Cl. ..................................... 156/69; 156/253; 156/293; 156/513; 156/514
[58] Field of Search ................. 156/69, 293, 513, 514, 156/552, 253

[56] References Cited

U.S. PATENT DOCUMENTS

| | | | |
|---|---|---|---|
| 2,251,634 | 8/1941 | Phillips | 156/514 |
| 3,244,576 | 4/1966 | Swartz | 156/513 |
| 3,322,590 | 5/1967 | Clark | 156/276 |
| 3,376,687 | 4/1968 | Gewecke | 53/14 |
| 3,389,643 | 6/1968 | Lemcke et al. | 93/8 |
| 3,434,908 | 3/1969 | MacDonald | 156/514 |
| 3,558,397 | 1/1971 | Clark | 156/272 |
| 3,812,572 | 5/1974 | Weikert | 29/208 B |
| 3,821,046 | 6/1974 | Runge | 156/69 |
| 4,300,971 | 11/1981 | McAlister | 156/293 |
| 4,695,337 | 9/1987 | Christine | 156/514 |

Primary Examiner—Caleb Weston
Attorney, Agent, or Firm—Seidel, Gonda, Goldhammer & Abbott

[57] ABSTRACT

A web of plastic is welded to the internal surface of a plastic tube. A method, apparatus and product are described.

6 Claims, 2 Drawing Sheets

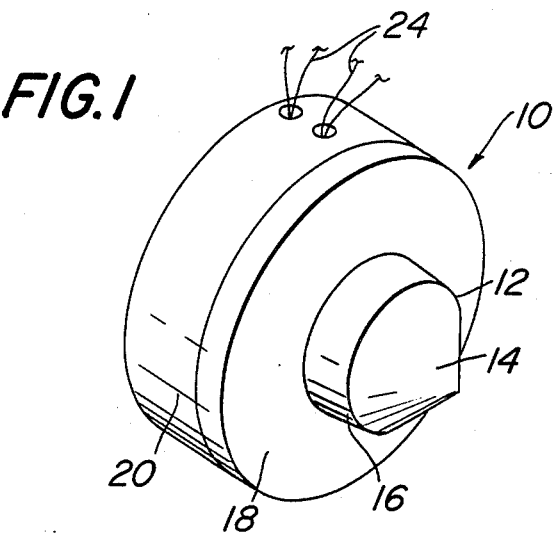
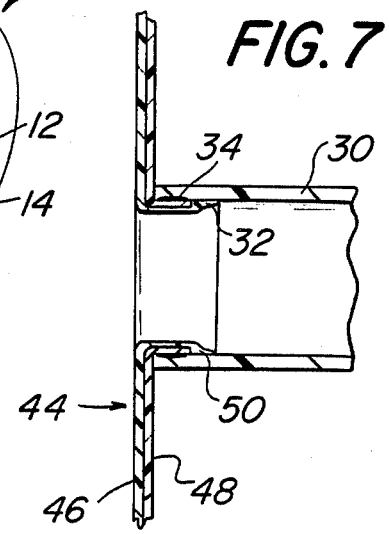
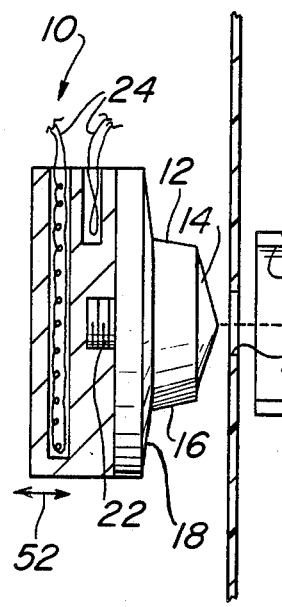
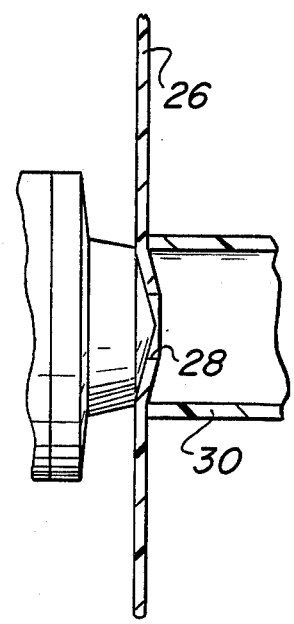

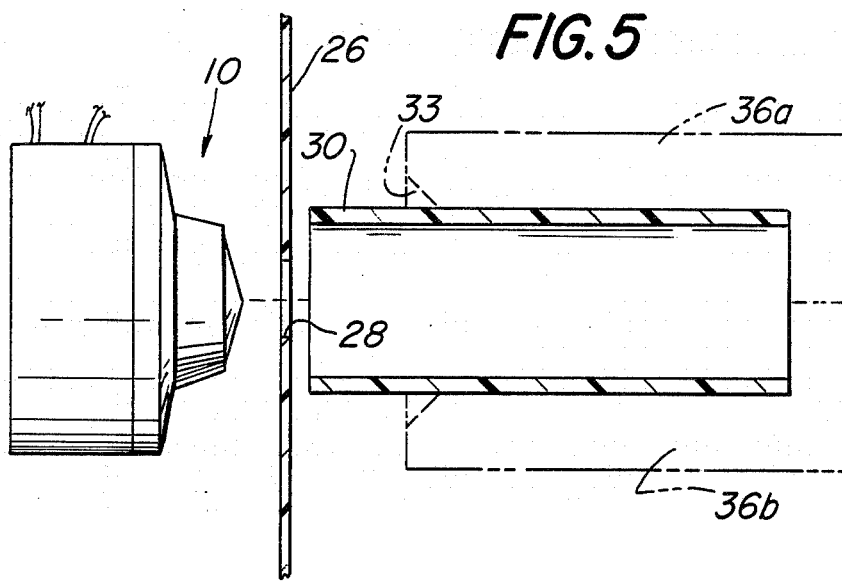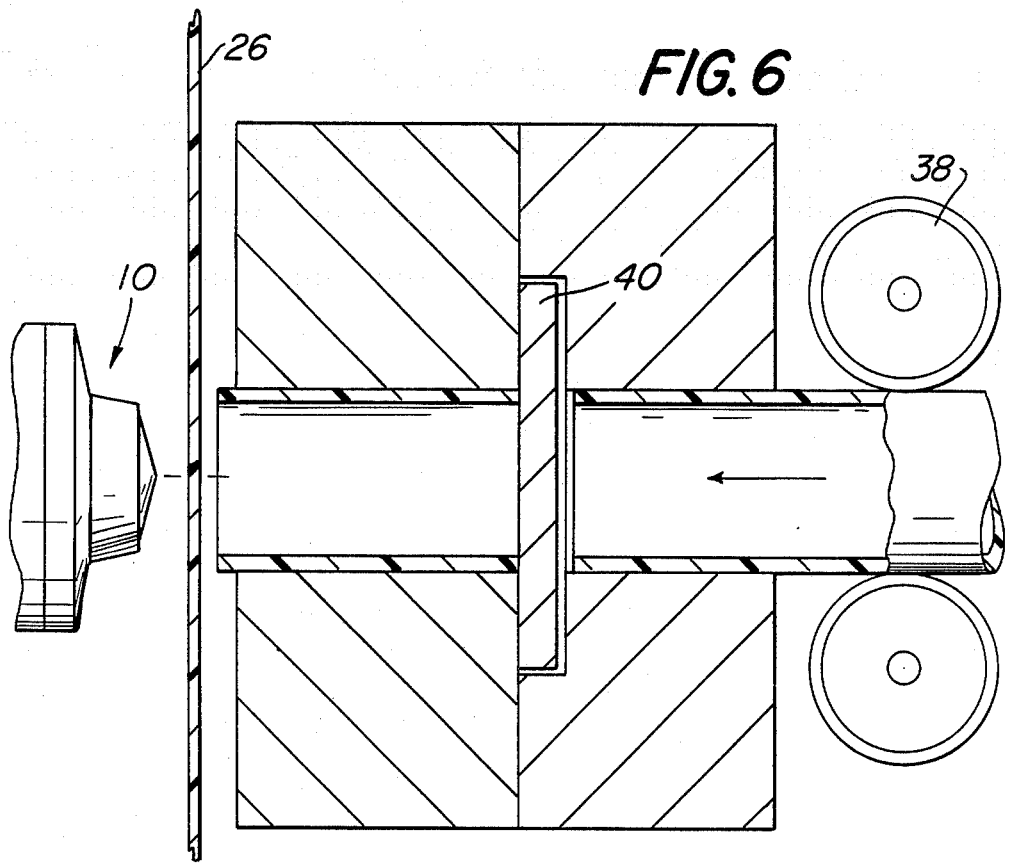

ATTACHING A PLASTIC TUBE TO A WEB OF PLASTIC

SCOPE OF THE INVENTION

This invention is directed to a method, device, and article of manufacture in which a web of plastic is welded to the internal surface of a plastic tube.

BACKGROUND OF THE INVENTION

Heretofore, when it was necessary to join a plastic tube to a web of plastic in a high speed operation, the web was placed around the exterior surface of the tube and then welded thereto. For example, see U.S. Pat. Nos. 3,322,590 and 3,558,397.

In U.S. Pat. No. 3,322,590, a plastic bag having a nipple is welded to a plastic tube by: inserting the end of the tube over a tapered electrode; inserting the nipple of the bag over the tube and electrode; inserting the nipple, tube, and electrode into a second electrode; and then passing an electronic current between the electrodes, thereby welding the nipple of the bag and the tube together. This method produces a bag having a nipple which is welded to the exterior surface of a tube.

U.S. Pat No. 3,558,397 teaches that a plastic bag having a nipple can be joined to the external surface of a tube by an electrode probe and jaw assembly electrodes. The jaw assembly electrodes comprise a plurality of blades which are set at right angles to the axis of the electrode. The resulting weld forms a plurality of ribs.

SUMMARY OF THE INVENTION

The present invention is directed to the welding of a web of plastic to the internal surface of a plastic tube. Specifically, a method for welding a web of flexible, weldable plastic to a flexible weldable plastic tube includes the steps of: (a) providing a tool having an axis, the tool being generally cylindrical, being adapted for welding, and adapted for moving back and forth along the axis of the tool; (b) coaxially aligning the axis of the tool and an axis of the tube; (c) placing the web perpendicular to the axis of the tube and between the tool and the tube; (d) moving the tool into the tube; (e) welding the web to the internal surface of the tube; and (f) removing the tool from the tube.

An apparatus for welding the plastic web to plastic tube includes a means for pushing a web into a tube. The pushing means is a cylindrical member having a tapered portion. The tapered portion decreases in diameter towards the free end of the cylindrical member. The smallest diameter of the tapered portion has an interference fit with the internal diameter of the tube. The apparatus also includes a means for welding the web to the internal surface of the tube. The welding means is operatively associated with the cylindrical member.

The article of manufacture includes a weldable plastic web and a weldable plastic tube which are welded together at the internal surface of the tube.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an isometric view of a welding tool embodiment made according to the present invention.

FIG. 2 is an elevational view of a first step in the method of welding a web to the internal surface of a tube.

FIG. 3 is an elevational view of a second step in the method of welding the web to the internal surface of the tube.

FIG. 4 is an elevational view of a final step in the method for welding the web to the internal surface of the tube.

FIG. 5 is an elevational view of an alternate embodiment of the present invention.

FIG. 6 is an elevational view of an alternate embodiment of the present invention.

FIG. 7 is an elevational view of an alternate embodiment of the present invention.

DETAILED DESCRIPTION OF THE INVENTION

Referring to the drawings wherein like numerals represent like elements, there is shown in FIG. 1 a preferred embodiment of the welding tool 10 made according to the present invention.

Welding tool 10 preferably includes a cylindrical member 12, a conical base 18, and a tool support 20. Cylindrical member 12 comprises a conical blunt point 14 and a tapered portion 16. Point 14 defines a free end of member 12. The taper of portion 16 decrease toward point 14. The degree of taper is preferably slight, so that when the tool 10 is inserted into a tube, the distortion of the tube is small. The smallest diameter of portion 16 is slightly greater than the internal diameter of the tube, so as to cause an interference fit between portion 16 and the internal surface of the tube. The exposed surface of member 12 and base 18 can be coated with a nonstick material (not shown), which is well known in the art, to prevent material adhesion to the tool during welding.

Tool support 20 is preferably cylindrical although other geometric shapes can be utilized. A conical base 18 is affixed to tool support 20. Conical base 18 preferably has the same diameter as support 20. The cylindrical member 12 is coaxial with conical base 18. Preferably, cylindrical member 12 and conical base 18 are made from a single material such as an energy conductive metal. Conical base 18 has a fastening member 22 which is preferably coaxial with base 18. Member 22 is preferably a threaded member and is located on the side of base 18 opposite the cylindrical member 12. Fastening member 22 is provided to join base 18 to support 20.

Tool support 20 is preferably provided with heating elements 24. Although, heating elements are illustrated as a preferred method of providing energy for the welding step, it is understood by those skilled in the art that there are numerous ways of providing the necessary energy for welding such as ultrasonic radiation, infrared radiation or electronic current.

Tool support 20 is also provided with means (not shown) for moving in a back and forth stroke as indicated by arrows 52 in FIG. 2. Such a means could comprise a two-way hydraulic cylinder. Such means are well-known to those skilled in the art.

Referring to FIGS. 2-4, the method of welding a platic web 26 to an internal surface 32 of a tube 30 is illustrated. Tool 10 and tube 30 are coaxially aligned. Web 26 is placed between tool 10 and tube 30. Preferably, web 26 includes a pre-pierced hole 28. Pre-pierced hole 28 is coaxially aligned with tool 10 and tube 30.

The pre-placed hole 28 is provided to minimize the amount of web which is welded to the internal surface of the tube. Preferably, the web is welded no further than about ⅛ to about ⅜ inches onto the internal surface of the tube. Accordingly, the axial length of the tapered portion 16 preferably does not need to be any longer than the depth to which the web is to be welded to the internal surface of the tube.

The tool 10 is advanced into the cavity of tube 30. (FIG. 3.) The tool pushes the web 26 into the tube 30. The tool then welds the web 26 to the interior surface 32 of the tube 30. The tool 10 is then removed from the tube 30. (FIG. 4.)

In FIG. 5, there is illustrated a further embodiment of the present invention wherein a split anvil 36 is provided for supporting tube 30. Typically, the tube needs no support during welding; the tube has sufficient strength provided by the cylindrical cross section of the tube. Split anvil 36 has an upper portion A and a lower portion B. These portions are movable between an open and closed position. The split anvil 36 supports tube 30 while web 26 is welded to the internal surface 32. A bevel 33 can be provided in the anvil to shape the resulting weld.

Referring to FIG. 6, there is shown an alternate embodiment of the present invention. This embodiment includes tube feed means 38 which continuously feeds tubing to the tool 10. This device also includes a tube shearing means 40 which cuts the tubing to a desired length. Web 26 does not include a pre-pierced hole 28. The feed means 38 and shearing means 40 are well known within the art.

Referring to FIG. 7, there is shown an alternate embodiment of the web which is welded to the internal surface 32 of the tube 30. This web 44 is constructed of a two layer or laminate material. Of course, any number of lamination are possible. The first laminate 46 is joined in a conventional manner to the second laminate 48. As the tool 20 pushes the web 44 into the tube 30, the interference fit of the tapered portion 16 of the member 12 scrapes a portion of the first laminate 46, melts same and pushes it beyond the terminal end of the second laminate 48, thus forming a first laminate seal 50. This provides an additional advantage to the present invention, namely the second laminate never contacts the material which passes through the tube or is held within the web.

The web can be formed into any shape such as bags or pouches. The tube or tubular section can be any length or diameter and may be shaped at the end away from the web with external threads for engagement with a cap, for receipt of a plug, sealed shut by pinching closed, provided with a distribution head for spreading materials such as condiments, etc.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for welding a web of flexible, weldable plastic to a flexible, weldable flangeless plastic tube comprising the steps of:
   (a) providing a tool having an axis, the tool being generally cylindrical, adapted for welding, and adapted for moving back and forth along the axis of the tool;
   (b) coaxially aligning the axis of the tool and an axis of the flangeless tube;
   (c) placing the web perpendicular to the axis of the tube and between the tool and the flangeless tube;
   (d) moving the tool into the flangeless tube;
   (e) welding the web to the internal surface of the flangeless tube; and
   (f) removing the tool from the flangeless tube.

2. The method according to claim 1 wherein the web has a pre-pierced hole and the hole is coaxially aligned with said tool axis.

3. The method according to claim 1 further comprising the step of scraping off a portion of said web.

4. The method according to claim 1 further comprising the step of feeding said tube to said tool.

5. The method according to claim 4 further comprising the step of shearing said tube.

6. The method according to claim 1 further comprising supporting said tube when said tool is moved into said tube.

* * * * *